(12) United States Patent
Soleri et al.

(10) Patent No.: US 10,830,198 B2
(45) Date of Patent: Nov. 10, 2020

(54) DEPOSIT MITIGATION FOR GASEOUS FUEL INJECTORS

(71) Applicant: Westport Power Inc., Vancouver (CA)

(72) Inventors: Dominique J. Soleri, Exincourt (FR);
Patric Ouellette, Vancouver (CA);
Hamed Karimi Sharif, Vancouver (CA)

(73) Assignee: WESTPOINT POWER INC., Vancouver (CA)

( * ) Notice: Subject to any disclaimer, the term of this patent is extended or adjusted under 35 U.S.C. 154(b) by 6 days.

(21) Appl. No.: 15/754,944

(22) PCT Filed: Aug. 26, 2016

(86) PCT No.: PCT/CA2016/051013
§ 371 (c)(1),
(2) Date: Feb. 23, 2018

(87) PCT Pub. No.: WO2017/031598
PCT Pub. Date: Mar. 2, 2017

(65) Prior Publication Data
US 2019/0032618 A1    Jan. 31, 2019

Related U.S. Application Data

(60) Provisional application No. 62/210,921, filed on Aug. 27, 2015.

(51) Int. Cl.
*F02M 19/02* (2006.01)
*F02M 65/00* (2006.01)
(Continued)

(52) U.S. Cl.
CPC ............. *F02M 65/008* (2013.01); *B08B 5/02* (2013.01); *B08B 17/06* (2013.01); *F02D 17/02* (2013.01);
(Continued)

(58) Field of Classification Search
CPC ............. F02M 65/008; F02M 21/0263; F02M 21/0275; F02M 21/0293; F02M 21/0296; F02D 41/0027; F02D 41/22; F02D 41/401
See application file for complete search history.

(56) References Cited

U.S. PATENT DOCUMENTS 3,751,911 A * 8/1973 De Tartaglia ............. F23R 3/04
60/756
4,823,756 A * 4/1989 Ziejewski ............. F02M 51/00
123/1 A
(Continued)

FOREIGN PATENT DOCUMENTS

CN     107636284 A     1/2018
CN     101182927 A     5/2018
(Continued)

OTHER PUBLICATIONS

International Search Report and Written Opinion of the International Searching Authority, dated Oct. 5, 2016, for International Application No. PCT/CA2016/051013, 7 pages.
(Continued)

*Primary Examiner* — Thomas N Moulis
(74) *Attorney, Agent, or Firm* — Seed IP Law Group LLP

(57) ABSTRACT

A method for deposit mitigation in a gaseous fuel injector that introduces a gaseous fuel through a gaseous fuel orifice directly into a combustion chamber of an internal combustion engine includes at least one of a) reducing the ago length of the gaseous fuel orifice by substantially between 10% to 50% of a previous length of a previous gaseous fuel orifice showing deposit accumulation above a predetermined threshold; b) providing the gaseous fuel orifice with an inwardly and substantially linearly tapering profile; c) determining deposit mitigation is needed; and performing at least one of the following deposit mitigation techniques i)
(Continued)

increasing gaseous fuel injection pressure wherein deposit accumulation is reduced during fuel injection; and ii) decreasing gaseous fuel temperature wherein a rate of deposit accumulation is reduced; and d) injecting compressed air through the gaseous fuel orifice during shutdown of the internal combustion engine; whereby torque loss in the internal combustion engine due to deposit accumulation in the gaseous fuel orifice is reduced below a predetermined value.

25 Claims, 6 Drawing Sheets

(51) Int. Cl.
| | |
|---|---|
| *F02M 43/04* | (2006.01) |
| *F02D 41/22* | (2006.01) |
| *F02D 41/40* | (2006.01) |
| *F02D 41/00* | (2006.01) |
| *F02D 19/08* | (2006.01) |
| *F02D 19/06* | (2006.01) |
| *F02M 21/02* | (2006.01) |
| *B08B 5/02* | (2006.01) |
| *B08B 17/06* | (2006.01) |
| *F02D 17/02* | (2006.01) |
| *F02M 25/14* | (2006.01) |
| *F02M 53/04* | (2006.01) |
| *F02D 41/38* | (2006.01) |
| *F02B 77/04* | (2006.01) |

(52) U.S. Cl.
CPC ..... *F02D 19/0605* (2013.01); *F02D 19/0623* (2013.01); *F02D 19/0647* (2013.01); *F02D 19/0689* (2013.01); *F02D 19/0694* (2013.01); *F02D 19/081* (2013.01); *F02D 41/008* (2013.01); *F02D 41/0027* (2013.01); *F02D 41/22* (2013.01); *F02D 41/401* (2013.01); *F02M 21/0248* (2013.01); *F02M 21/0263* (2013.01); *F02M 21/0275* (2013.01); *F02M 21/0293* (2013.01); *F02M 25/14* (2013.01); *F02M 43/04* (2013.01); *F02M 53/043* (2013.01); *B08B 2203/027* (2013.01); *F02B 77/04* (2013.01); *F02D 41/0025* (2013.01); *F02D 2041/389* (2013.01); *F02D 2200/06* (2013.01); *F02M 2200/06* (2013.01); *F02M 2200/46* (2013.01); *Y02T 10/32* (2013.01); *Y02T 10/36* (2013.01); *Y02T 10/44* (2013.01)

(56) References Cited

U.S. PATENT DOCUMENTS

| | | | | |
|---|---|---|---|---|
| 4,892,065 A | * | 1/1990 | List | F02M 57/02 |
| | | | | 123/26 |
| 4,995,915 A | * | 2/1991 | Sewell | F01D 25/002 |
| | | | | 134/22.1 |
| 5,195,482 A | * | 3/1993 | Smith | F02M 53/04 |
| | | | | 123/198 A |
| 5,239,970 A | | 8/1993 | Kurihara | |
| 5,288,021 A | * | 2/1994 | Sood | F23C 7/004 |
| | | | | 239/132.5 |
| 5,698,043 A | * | 12/1997 | Acevedo | F02M 65/008 |
| | | | | 134/10 |
| 5,730,108 A | * | 3/1998 | Hill | F02D 7/02 |
| | | | | 123/531 |
| 5,921,474 A | | 7/1999 | Zimmermann et al. | |
| 5,924,634 A | | 7/1999 | Arndt et al. | |
| 5,933,700 A | | 8/1999 | Tilton | |
| 5,941,210 A | * | 8/1999 | Hill | F02B 43/00 |
| | | | | 123/298 |
| 6,095,101 A | * | 8/2000 | Pedersen | F02B 7/02 |
| | | | | 123/27 GE |
| 6,276,334 B1 | | 8/2001 | Flynn et al. | |
| 6,298,833 B1 | | 10/2001 | Douville et al. | |
| 6,336,598 B1 | | 1/2002 | Touchette et al. | |
| 6,644,565 B2 | * | 11/2003 | Hockenberger | F02M 61/1806 |
| | | | | 239/533.12 |
| 7,357,338 B1 | | 4/2008 | Reatherford et al. | |
| 7,360,722 B2 | * | 4/2008 | Stockner | F02M 61/1873 |
| | | | | 239/533.12 |
| 9,657,701 B2 | * | 5/2017 | Kato | F02M 61/1893 |
| 2002/0139121 A1 | * | 10/2002 | Cornwell | F23D 11/383 |
| | | | | 60/776 |
| 2002/0165088 A1 | * | 11/2002 | Haskew | B01J 23/6567 |
| | | | | 502/172 |
| 2004/0036048 A1 | * | 2/2004 | Petersen | F02M 51/0685 |
| | | | | 251/129.15 |
| 2006/0081722 A1 | * | 4/2006 | Kato | F02D 19/0694 |
| | | | | 239/96 |
| 2006/0091239 A1 | * | 5/2006 | Aradi | F02M 65/007 |
| | | | | 239/533.2 |
| 2007/0040053 A1 | * | 2/2007 | Date | F02M 61/1846 |
| | | | | 239/533.2 |
| 2009/0007695 A1 | * | 1/2009 | Araki | G01F 1/383 |
| | | | | 73/861.47 |
| 2009/0020633 A1 | * | 1/2009 | Limmer | F02M 61/1806 |
| | | | | 239/533.12 |
| 2011/0030635 A1 | * | 2/2011 | Siuchta | F02M 57/025 |
| | | | | 123/1 A |
| 2011/0126529 A1 | * | 6/2011 | Park | F01N 3/2066 |
| | | | | 60/303 |
| 2012/0000996 A1 | * | 1/2012 | Kobayashi | F02M 57/04 |
| | | | | 239/584 |
| 2013/0054123 A1 | | 2/2013 | Ikemoto | |
| 2014/0102405 A1 | * | 4/2014 | Weber | F02B 17/005 |
| | | | | 123/295 |
| 2014/0116392 A1 | * | 5/2014 | Fiveland | F02M 61/14 |
| | | | | 123/470 |
| 2014/0238340 A1 | * | 8/2014 | Dunn | F02M 43/00 |
| | | | | 123/299 |
| 2015/0096530 A1 | | 4/2015 | Bzymek et al. | |
| 2015/0251277 A1 | * | 9/2015 | Marchione | B23K 26/384 |
| | | | | 239/533.2 |
| 2015/0275813 A1 | * | 10/2015 | Dunn et al. | F02D 41/3094 |
| 2016/0032857 A1 | * | 2/2016 | Wu | F02D 41/221 |
| | | | | 701/105 |
| 2017/0045023 A1 | * | 2/2017 | Kolhouse | F02M 53/043 |
| 2017/0051713 A1 | * | 2/2017 | Peters | F02M 53/046 |
| 2017/0226973 A1 | * | 8/2017 | Blizard | F02M 43/00 |
| 2018/0100449 A1 | | 4/2018 | Welch et al. | |

FOREIGN PATENT DOCUMENTS

| | | |
|---|---|---|
| EP | 0 667 450 A1 | 8/1995 |
| WO | 2005/031149 A1 | 4/2005 |
| WO | 2012/106512 A2 | 8/2012 |
| WO | 2012/106512 A3 | 8/2012 |
| WO | 2014/056103 A1 | 4/2014 |
| WO | WO-2016018375 A1 * | 2/2016 ............. F02M 43/00 |

OTHER PUBLICATIONS

Extended European Search Report, dated Apr. 9, 2019, for European Application No. 16838176.2-1007, 10 pages.

* cited by examiner

DEPOSIT MITIGATION FOR GASEOUS FUEL INJECTORS

FIELD OF THE INVENTION

The present application relates to deposit mitigation for fuel injectors, and particularly gaseous fuel injectors, employed in internal combustion engines.

BACKGROUND OF THE INVENTION

High pressure direct injection (HPDI) is a technology for internal combustion engines where gaseous fuel is introduced into a combustion chamber later in the compression stroke and burns in a stratified combustion mode. HPDI technology delivers torque performance comparable to state of the art internal combustion engines that burn diesel fuel, and compared to these diesel engines has reduced emissions and lower fuelling costs. As used herein a gaseous fuel is any fuel that is in a gas state at standard temperature and pressure that in the context of this application is 20 degrees Celsius (° C.) and 1 atmosphere (ATM). A typical gaseous fuel employed in HPDI engines is natural gas. Natural gas is a composition of various gases whose primary constituent is methane, which typically can vary between 70 and 90% mole fraction. Besides natural gas and methane fuel, other gaseous fuels include propane, butane, hydrogen, ethane, biogas and mixtures thereof. In conventional diesel fuelled engines, the fuel is ignited by the pressure and temperature established in the combustion chamber during the compression stroke, which is referred to as compression ignition. Methane is a relatively high octane, low cetane fuel (unlike diesel fuel that has a relatively low octane number and high cetane number) that is not easily compression ignitable. Typically, a pilot fuel is employed to ignite the gaseous fuel in HPDI engines. The pilot fuel is introduced later in the compression stroke, before, during and/or after gaseous fuel injection, and is compression ignited; and the combustion of the pilot fuel establishes a pressure and temperature environment suitable for igniting the gaseous fuel. An exemplary pilot fuel is diesel fuel. It is a challenge to directly inject both a gaseous fuel and a pilot fuel into combustion chambers of light duty, medium duty and heavy duty internal combustion engines. For improved ignition and combustion performance, it is advantageous to align gaseous fuel jets with respective pilot fuel jets. However, a number of factors combine to leave little space in the cylinder head to position separate gaseous fuel injectors and pilot fuel injectors. Concentric needle fuel injectors that introduce both a pilot fuel and a gaseous fuel, separately and independently from each other, have a reduced footprint in the cylinder head, compared to separate fuel injectors, and allow an increased amount of symmetry between the gaseous and pilot fuel jets. Integrated side-by-side fuel injectors also have a reduced footprint compared to separate fuel injectors, although there is an increased footprint compared to concentric-needle fuel injectors their footprint is acceptable in some applications. As used herein, dual fuel injectors that introduce a liquid fuel and a gaseous fuel include both concentric needle fuel injectors and side-by-side fuel injectors. A liquid fuel is any fuel in the liquid state at standard temperature and pressure and include diesel, dimethyl ether, biodiesel, kerosene and diesel fuel marine (DFM).

It has been found that an internal combustion engine operating with new and previously unused dual fuel injectors experiences torque loss during an initial break-in period, after which, the rate of torque loss substantially decreases. That is, the torque output of the engine at a particular commanded quantity of fuelling decreases over a break-in period in the absence of any compensating factors. As used herein, break-in period is defined as the amount of time it takes for the rate of torque loss to diminish to a predetermined value, preferably zero, as new fuel injectors are operated with a predefined engine load and speed, or alternatively with a predetermined operational cycle. Characteristically, the break-in period can change depending upon which parts of the engine map the fuel injectors are used. With reference to FIG. 1, curve 10 illustrates a torque curve for an engine system employing dual fuel injectors that uses no mitigation techniques for deposit accumulation. After time T1 the torque of the engine has reduced from a nominal value to a stable value of torque TR1 as a result of deposit accumulation. As the engine operates, deposits form on nozzle orifices that introduce liquid fuel and gaseous fuel, thereby reducing the cross-sectional flow area of the individual orifices. As deposits accumulate the mass flow rate of fuel through these nozzle orifices decreases, such that over a given injection window at any given injection pressure, the total quantity of injected fuel decreases. This results in a reduction in heat release from combustion and the consequential torque loss. Furthermore, depending upon the particular fuel injector and application, it is possible for deposits to continue to accumulate after the break-in period, leading to further performance degradation over time.

The state of the art is lacking in techniques for mitigating the effects of deposit accumulation in fuel injectors that introduce liquid and/or gaseous fuels. The present method and apparatus provide a technique for deposit mitigation in fuel injectors employed in internal combustion engines.

SUMMARY OF THE INVENTION

An improved method for deposit mitigation in a gaseous fuel injector that introduces a gaseous fuel through a gaseous fuel orifice directly into a combustion chamber of an internal combustion engine includes at least one of a) reducing the length of the gaseous fuel orifice by substantially between 10% to 50% of a previous length of a previous gaseous fuel orifice showing deposit accumulation above a predetermined threshold; b) providing the gaseous fuel orifice with an inwardly and substantially linearly tapering profile; c) determining deposit mitigation is needed; and performing at least one of the following deposit mitigation techniques i) increasing gaseous fuel injection pressure whereby deposit accumulation is reduced during fuel injection; and ii) decreasing gaseous fuel temperature whereby a rate of deposit accumulation is reduced; and d) injecting compressed air through the gaseous fuel orifice during shutdown of the internal combustion engine; whereby torque loss in the internal combustion engine due to deposit accumulation in the gaseous fuel orifice is reduced below a predetermined value.

In an exemplary embodiment, the gaseous fuel injector is a dual fuel injector that also introduces a liquid fuel through a liquid fuel orifice directly into the combustion chamber. The method further comprises at least one of a) reducing the length of the liquid fuel orifice by substantially between 10% to 50% of a previous length of a previous gaseous fuel orifice showing deposit accumulation above a predetermined threshold; b) providing the liquid-fuel orifice with an inwardly and substantially linearly tapering profile; c) determining deposit mitigation is needed; and performing at least one of the following deposit mitigation techniques i) increasing liquid fuel injection pressure whereby deposit accumulation is reduced during fuel injection; and ii) decreasing liquid fuel temperature whereby a rate of deposit accumulation is reduced.

An improved gaseous fuel injector for directly introducing a gaseous fuel into a combustion chamber of an internal combustion engine includes a gaseous fuel injection valve; a gaseous fuel orifice extending between a first chamber downstream from the gaseous fuel injection valve and outside the gaseous fuel injector; characterized in at least one of the following deposit mitigation features (a) the length of the gaseous fuel orifice is reduced by substantially between 10% to 50% of a previous gaseous fuel orifice length; and (b) the gaseous fuel orifice comprises an inwardly and substantially linearly tapering profile; whereby torque loss in the internal combustion engine due to deposit accumulation in the gaseous fuel orifice is reduced below a predetermined value.

In an exemplary embodiment, the gaseous fuel injector is a dual fuel injector that also introduces a liquid fuel into the combustion chamber. The gaseous fuel injector further includes a liquid fuel injection valve and a liquid fuel orifice extending between a second chamber downstream from the liquid fuel injection valve and outside the dual fuel injector, and is characterized in at least one of the following deposit mitigation features (a) the length of the liquid fuel orifice is reduced by substantially between 10% to 50% of a previous liquid fuel orifice length; and (b) the liquid fuel orifice comprises an inwardly and substantially linearly tapering profile.

An improved method for deposit mitigation of a fuel injector of an internal combustion engine includes coating at least one of a nozzle, a nozzle orifice and a valve member with a coating, the coating is at least one of (a) a fluorosilane based coating; (b) a catalytic coating comprising at least one of cerium oxide, oxides of lanthanide series elements, transition metals, and oxides of transition metals; and (c) a catalytic coating comprising deposit nucleation sites that promote the formation of a porous structure.

For deposit mitigation of a dual fuel injector that introduces a gaseous fuel separately and independently from a liquid fuel another method can optionally and independent of the other mitigation methods described herein be employed. The method includes mixing the liquid fuel with an additive such that deposit accumulation is reduced in a gaseous fuel nozzle orifice. Similarly for deposit mitigation of a gaseous fuel injector that introduces only a gaseous fuel through a gaseous fuel nozzle orifice and that is actuated hydraulically by a hydraulic fluid, a method can optionally and independent of the other mitigation methods described herein be employed to include mixing the hydraulic fluid with an additive such that deposit accumulation is reduced in the gaseous fuel nozzle orifice.

DETAILED DESCRIPTION OF PREFERRED EMBODIMENT(S)

Figure 2:
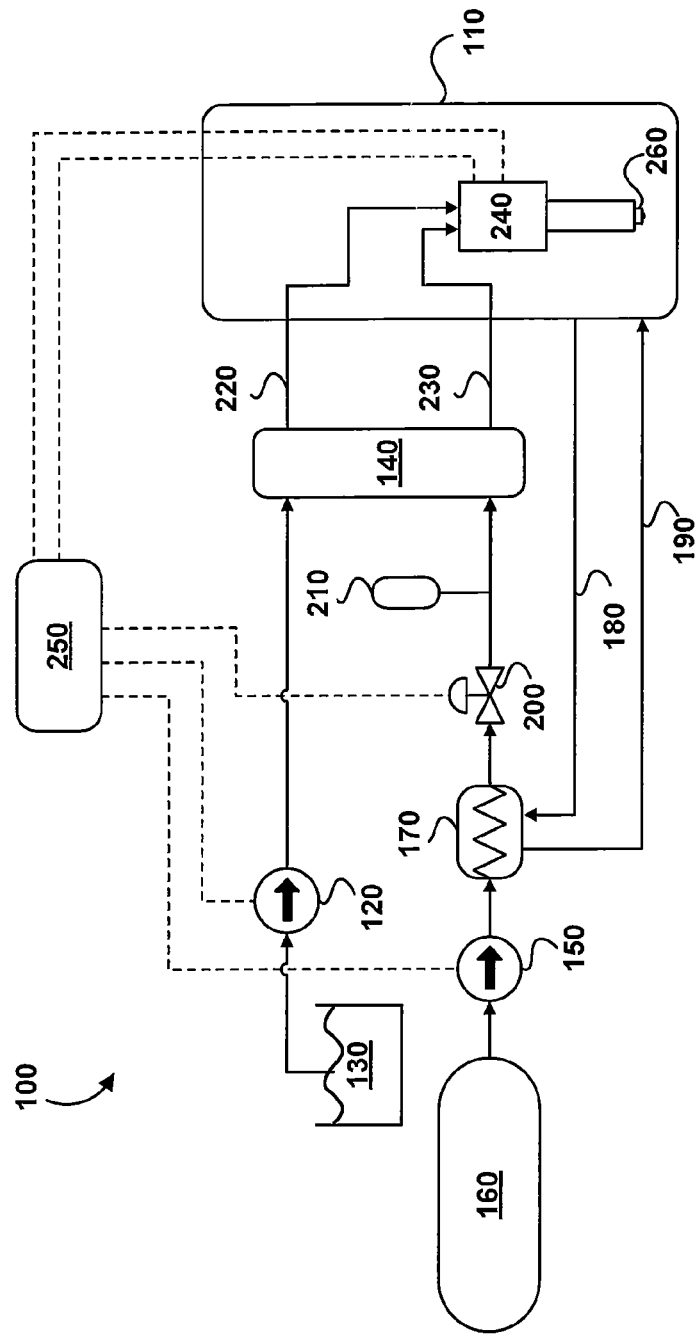
FIG. 2 is a schematic view of a liquid and gaseous fuel system for an internal combustion engine according to one embodiment.

Referring to FIG. 2, fuel system apparatus 100 is illustrated according to one embodiment for supplying fuel to internal combustion engine 110. Pumping apparatus 120 pressurizes liquid fuel from liquid fuel storage vessel 130 and delivers the pressurized liquid fuel to fuel pressure bias apparatus 140. Pumping apparatus 120 can include a transfer pump located in liquid fuel storage vessel 130, an inlet metering valve and a common rail pump, in addition to other fuel system components known to those skilled in the technology. Pumping apparatus 150 pressurizes gaseous fuel from cryogenic storage vessel 160 and delivers it to fuel pressure bias apparatus 140 through heat exchange apparatus 170 where the enthalpy of the gaseous fuel is increased. Gaseous fuel is stored in liquefied form in cryogenic storage vessel 160 such that pumping apparatus 150 is a cryogenic pumping apparatus, and the gaseous fuel changes from the liquid state to either gas or supercritical state between vessel 160 and downstream of heat exchange apparatus 170. Although pumping apparatus 150 and heat exchange apparatus 170 are illustrated external to cryogenic storage vessel 160, the pumping apparatus alone or in combination with the heat exchange apparatus can be located inside the cryogenic storage vessel, in whole or in part, as would be known by those familiar with the technology. Heat exchange apparatus 170 can employ engine coolant, fluidly communicated from and to engine 110 through conduits 180 and 190 respectively, as a heat exchange medium. Shut-off valve 200 is employed to separate heat exchange apparatus 170 from the downstream fuel system when the internal combustion engine is shut down. Accumulator 210 stores a predetermined volume of pressurized and vaporized gaseous fuel as a buffer against fuel demand from the internal combustion engine, which may be a vessel or appropriately sized piping. Fuel pressure bias apparatus 140 is employed to keep liquid fuel pressure in liquid fuel rail 220 within a predetermined range of gaseous fuel pressure in gaseous fuel rail 230, which is needed for proper operation of dual fuel injector 240. U.S. Pat. No. 6,298,833, issued on Oct. 9, 2001 to Douville et al., and co-owned by the Applicant, discloses various embodiments of fuel pressure bias apparatus 140 that can be employed herein, although other techniques for maintaining a pressure bias between two fuels can also be employed. Dual fuel injector 240 is fluidly connected with liquid fuel rail 220 and gaseous fuel rail 230 and is operative to separately and independently inject liquid fuel and gaseous fuel into a combustion chamber. In a typical embodiment, fuel injector 240 employs the liquid fuel as a hydraulic fluid for actuating the injector, and accordingly the pressure bias between the liquid fuel and the gaseous fuel is maintained within a predetermined range to operate the fuel injector. Although only one such fuel injector is illustrated, there can be a plurality of fuel injectors in other embodiments. Fuel injector 240 can be like the dual fuel injector found in the Applicant's co-owned U.S. Pat. No. 6,336,598;

issued Jan. 8, 2002 to Touchette et al., although other types of dual fuel injectors can be employed. Electronic controller 250 is operatively connected with pumping apparatuses 120 and 150, shut-off valve 200 and fuel injector 240 to command their operation to reduce deposit accumulation in gaseous and liquid orifices as will be described in more detail below.

Figure 3:
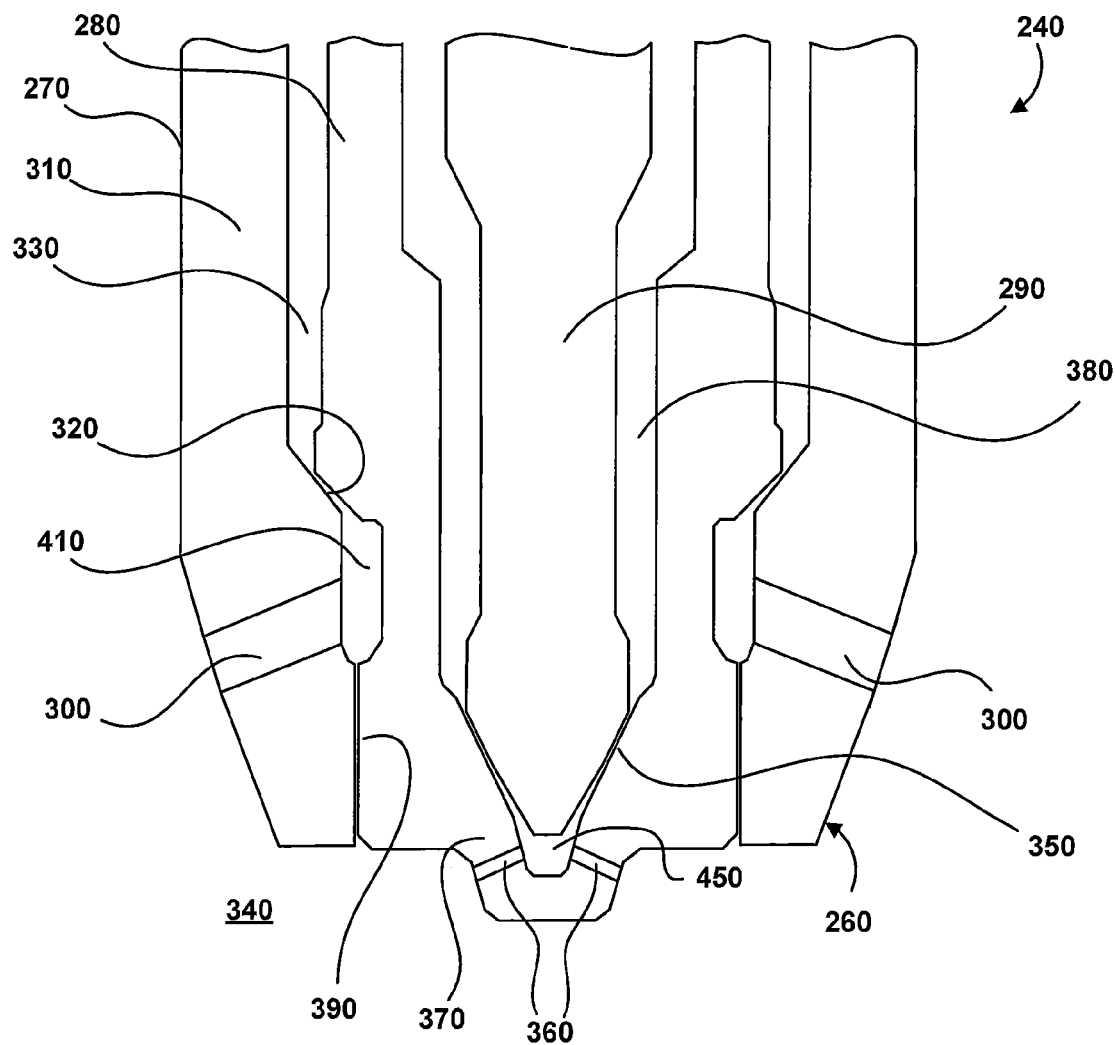
FIG. 3 is a schematic view of a nozzle of a dual fuel injector in the internal combustion engine of FIG. 2.

Referring now to FIG. 3, fuel injector 240 is described in further detail, and in particular the portion of the fuel injector disposed in the combustion chamber referred to as nozzle 260. Fuel injector 240 has a concentric needle arrangement in the illustrated embodiment, including valve body 270, first valve member 280 and second valve member 290. Valve body 270 further includes known structures for housing respective actuator assemblies (not shown) for first and second valve members 280 and 290, and inlets for receiving respective fuels and delivering same to the illustrated nozzle portion of valve body 270. Valve body 270 at the nozzle is generally tubular in shape and comprises gaseous fuel orifices 300 formed in wall 310. Although only two gaseous fuel orifices 300 are representatively illustrated in the cross section shown in FIG. 3 it is understood by those familiar with the technology that there are typically a plurality of gaseous fuel orifices spaced around the nozzle perimeter. First valve member 280, in the form of a hollow needle or sleeve, is actuatable for reciprocating movement within valve body 270. First valve member 280 is made to reciprocate to open and close first injection valve 320. When first injection valve 320 is open, gaseous fuel stored in plenum 330 is introduced into combustion chamber 340 through gaseous fuel orifice 300. In the illustrated fuel injector, plenum 330 is an annular cavity formed between valve body 270 and first valve member 280. Second valve member 290, also known as a needle, is actuatable for reciprocating movement within the hollow interior of first valve member 280, and is made to reciprocate to open and close second injection valve 350 to introduce liquid fuel into combustion chamber 340 through liquid fuel orifices 360 formed in tip wall 370 of the first valve member. Although only two liquid fuel orifices 360 are representatively illustrated in the cross section shown in FIG. 3, it is understood by those familiar with the technology that there can be a plurality of liquid fuel orifices spaced around the perimeter of the nozzle tip. While second injection valve 350 is open, liquid fuel flows from annular plenum 380 formed between first and second valve members 280 and 290, through second injection valve 350 and exits nozzle 260 through liquid fuel orifices 360, into combustion chamber 340. First and second valve members 280 and 290 can be electrically actuated and made to move directly by magnetic forces or hydraulically actuated using apparatus known by people skilled in fuel injector technology. Match-fit 390 at distal ends of valve body 270 and first valve member 280, comprises opposite facing surfaces that allow the first valve member to move relative to the valve body when actuated between open and closed positions. Match-fit 390 can alternatively be called nose clearance, referring to the clearance between the injector body and the valve member.

Deposits can accumulate in orifices 300 and 360 as engine 110 operates, and these deposits lead to gaseous fuel flow loss and liquid fuel flow loss through the respective nozzle holes, resulting in torque loss in the engine. Several techniques were developed to mitigate the effects of deposit formation, including orifice geometries inhibiting deposit formation, and adaptation of gaseous and liquid fuel pressure and temperature to remove deposits and/or reduce the formation of deposits altogether, as will now be described.

As used herein, deposit (including coking) mitigation refers to the removal of deposits in orifices 300 and/or orifices 360, and/or the reduction in the rate of accumulation of deposits in these orifices.

As injector 240 is operated for the first time it experiehces gaseous fuel and liquid fuel flow loss through respective orifices 300 and 360 over an initial break-in period, after which the flow stabilizes. As used herein, flow loss refers to the reduction in gaseous fuel and liquid fuel mass flow rates for given injection pressures through respective orifices 300 and 360. Injection pressure is defined herein to be the difference between fuel pressure upstream of the injection valve and the pressure in the combustion chamber. Typically, the pressure upstream of the injection valve is substantially equal to the pressure in the fuel rail. Liquid fuel injection pressure is the difference between liquid fuel pressure in liquid fuel rail 220 and the pressure in combustion chamber 340, and gaseous fuel injection pressure is the difference between gaseous fuel pressure in gaseous fuel rail 230 and the pressure in the combustion chamber. In some applications the reduction in mass flow rate after the initial break-in period is acceptable. However, when the flow loss is reduced, and particularly for gaseous fuel flow loss when the engine primarily derives power from the gaseous fuel, the torque performance of engine 110 is improved. It was discovered that by shortening the length of orifices 300 and 360 the flow loss in these orifices is reduced. A reduction in a previous length of a previous gaseous fuel orifice showing deposit accumulation above a predetermined threshold of either orifices 300 and 360, or both, by substantially between a range of 10% and 50% shows a statistically significant reduction in flow loss and improvement in torque performance. There is a limit to how much the length of these orifices can be reduced without impacting the structural stability and thermal integrity of nozzle 260. In those applications where fuel injectors like fuel injector 240 are currently being employed, break-in flow loss can be reduced and torque performance improved when the nozzle orifice lengths are decreased.

Figure 4:
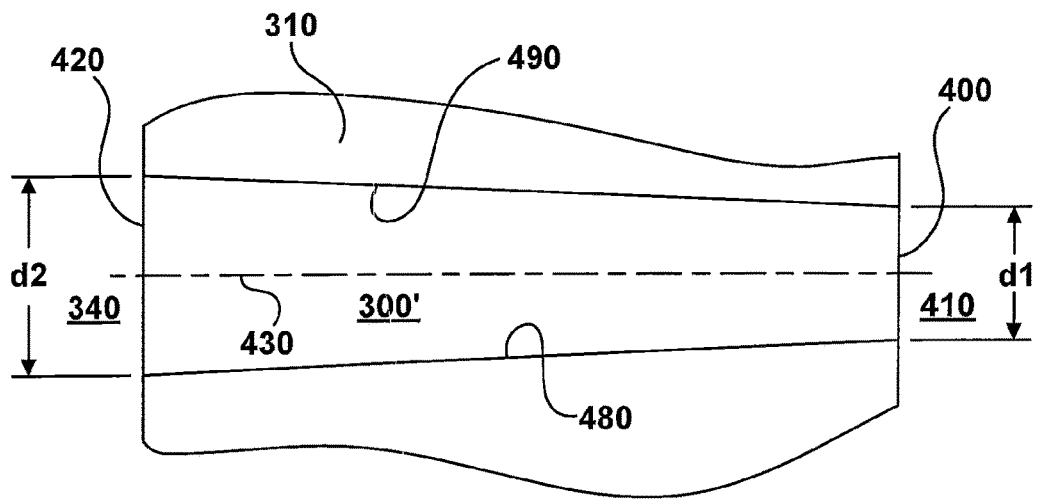
FIGS. 4 and 5 are cross-sectional views of a gaseous fuel orifice and a liquid fuel orifice respectively in the nozzle of FIG. 3 that mitigate the effect of deposit accumulation according to an embodiment.
Figure 5:
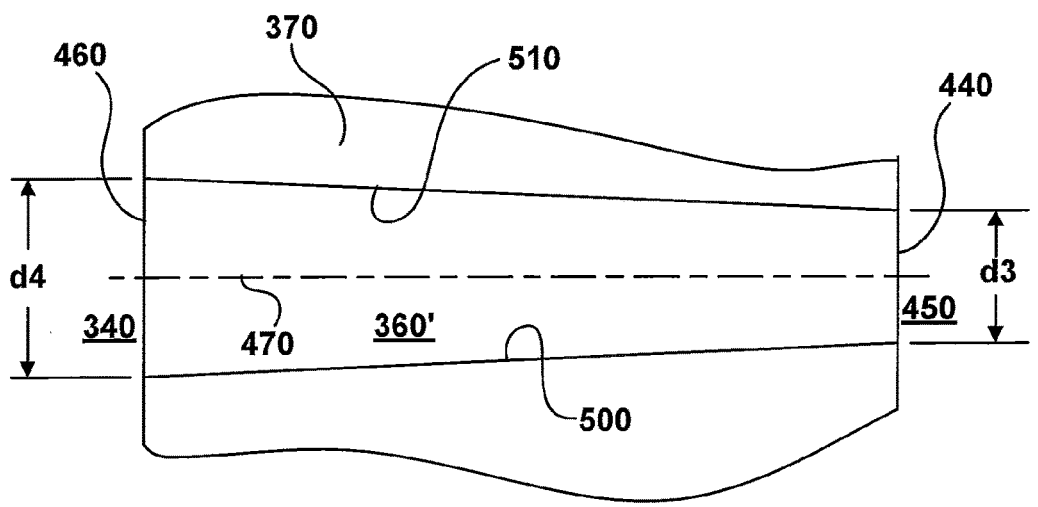

With reference to FIGS. 4 and 5, gaseous fuel orifice 300' and liquid fuel orifice 360' are illustrated with a geometry that inhibits the formation of deposits according to a first embodiment. Orifice 300' includes inlet opening 400, into which gaseous fuel enters from chamber 410, and outlet opening 420, from which gaseous fuel exits the orifice into combustion chamber 340. The surfaces of openings 400 and 420 are at right angles to longitudinal ax is 430 of orifice 300'. When the inlet and outlet openings of orifice 300' are not at right angles to longitudinal axis 430, openings 400 and 420 are defined to be the projection of these surfaces onto the plane that is at a right angle to longitudinal axis 430. Orifice 360' includes inlet opening 440, into which liquid fuel enters from chamber 450, and outlet opening 460, from which liquid fuel exits the orifice into combustion chamber 340. The surfaces of openings 440 and 460 are at right angles to longitudinal axis 470 of orifice 360'. When the inlet and outlet openings of orifice 360' are not at right angles to longitudinal axis 470, openings 440 and 460 are defined to be the projection of these surfaces onto the plane that is at a right angle to longitudinal axis 470. Diameter d1 is the diameter of inlet opening 400, and diameter d2 is the diameter of outlet opening 420, and diameters d1 and d2 are selected such that orifice 300' has an inwardly tapering profile. Diameter d1 is less than diameter d2 such that lines 480 and 490 extending between openings 400 and 420 are substantially linear and outwardly diverging with respect to chamber 410 and the cross-sectional area between chamber 410 and combustion chamber 340 is outwardly diverging. Diameter d3 is the diameter of inlet opening 440, and diameter d4 is the diameter of outlet opening 460, and diameters d3 and d4 are selected such that orifice 360' has an inwardly tapering profile. Diameter d3 is less than diameter d4 such that lines 500 and 510 extending between openings 440 and 460 are substantially linear and outwardly diverging with respect to chamber 450 and the cross-sectional area between chamber 450 and combustion chamber 340 is outwardly diverging. The diverging nature of orifices 300' and 360' protects the hydraulic diameter from external deposits, which may enter orifices 300' and 360' through respective outlet openings 420 and 460 during and after combustion of fuel in combustion chamber 340. Surprisingly, deposit formation is inhibited in orifice 300 of FIG. 3 when orifice 360' is employed in combination with orifice 300. Further reduction in deposit formation is experienced when orifices 300' and 360' are used in combination. A first difference in diameter between d2 and d1 is in the range of substantially between three (3) micrometers and fifty (50) micrometers, and more preferably in the range of substantially between fifteen (15) micrometers and thirty (30) micrometers. A second difference in diameter between d4 and d3 is in the range of substantially between three (3) micrometers and fifty (50) micrometers, and more preferably in the range of substantially between fifteen (15) micrometers and thirty (30) micrometers.

Figure 6:
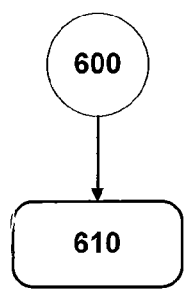
FIG. 6 is a flow chart view of a method for reducing deposit accumulation in orifices of the dual fuel injector of FIG. 3 according to another embodiment.

With reference to FIG. 6, a method of reducing deposit accumulation in orifice holes 300, 300', 360 and 360' is now discussed according to a second embodiment. As used herein, reducing deposit accumulation can refer to cleaning the orifices (removing deposits) that already have deposits built up in them, and/or limiting deposit accumulation in the orifices. Limiting deposit accumulation can refer to reducing the rate at which deposits accumulate and/or maintaining deposit accumulation below a predetermined level, which can refer to a thickness of a deposit layer, such as a coking layer, in the orifices. In step 600 it is determined that deposit mitigation is needed. This determination may involve employing a model to estimate a level of deposit accumulation and when the estimated level reaches a predetermined value it is determined that deposit mitigation is needed. Such a model may accept engine speed and engine load as inputs and generate an amount of deposit formation that occurs per engine cycle, which can be integrated from engine cycle to engine cycle to determine a total level of deposit accumulation. Alternatively, a counter or timer can be employed to count fuel injection cycles or elapsed engine operation time respectively, and when a predetermined number of cycles or amount of time has occurred it is determined that deposit mitigation is needed. In step 610 injection pressure of gaseous fuel and/or liquid fuel is increased such that deposit formation in respective fuel orifices (300, 300', 360, 360') is reduced, limited and/or removed. The injection pressures of the two fuels can be increased together when a predetermined differential pressure between gaseous fuel and liquid fuel is to be maintained, or when the dual fuel injector is operating in a single fuel mode the injection pressure of the single fuel can be increased alone. By increasing injection pressure across the respective orifices, deposits can be blown out and the orifices cleaned. Additionally, combustion products from the liquid fuel can be further inhibited from entering into orifices 300, 300' when gaseous fuel injection pressure increases, thereby reducing the further formation of deposits therein.

There are a variety of ways in which gaseous and liquid fuel injection pressure can be increased. Electronic controller 250 can command liquid fuel pumping apparatus 120 and gaseous fuel pumping apparatus 150 to increase liquid and gaseous fuel pressure respectively; while fuel pressure bias apparatus 140 maintains the differential pressure bias between these two fuels. Liquid fuels are incompressible fluids so the pressure of liquid fuel can be increased relatively efficiently compared to gaseous fuels, which are compressible fluids. It takes substantially more energy and time to compress gaseous fuels due to their compressible nature. As a result there is a practical limit to how much the pressure of liquid fuel and gaseous fuel can be increased in rails 220 and 230 before the fuel economy of engine 110 begins to be significantly impacted. Nevertheless, the technology for compressing compressible fluids is continuously developing and improving, and increasing the pressure in liquid and gaseous fuel rails 220 and 230 is a preferred technique for increasing liquid and gaseous fuel injection pressures.

Fuel system 100 and engine 110 are a high pressure direct injection system, where fuel injection timing for both liquid and gaseous fuels typically begins later in the compression stroke. As an example, liquid and gaseous fuel injection timing can begin after 30 degrees (°) before top dead center (BTDC) in the compression stroke. As a reference point, 180° BTDC in the compression stroke is when the piston (not shown) is at bottom dead center position (BDC) and 0° BTDC in the compression stroke is when the piston is at top dead center position (TDC), as would be known by those skilled in the technology. As the piston travels from 180° BTDC to 0° BTDC the pressure in combustion chamber 340 increases since the volume therein decreases. Injection pressure can be increased by advancing the timing of liquid and/or gaseous fuel injection, when combustion chamber pressure is less compared to normal fuel injection timing. In an exemplary embodiment liquid fuel injection timing can be advanced by at least 20° and gaseous fuel injection timing can be advanced by at least 40°, although any amount of advance in timing may have a beneficial effect over time. In those embodiments where engine 110 comprises a turbocharger or supercharger (not shown), injection pressure can also be increased when the engine is operating without boost, such that the charge of air inhaled into combustion chamber 340 during the intake stroke is substantially at atmospheric pressure. Further, advancing fuel injection timing can be used in combination with operation in those parts of the engine map where engine 110 is operating without boost to further increase fuel injection pressure.

When engine 110 comprises a plurality of dual fuel injectors associated with respective combustion chambers, skip-firing can be employed in combination with increasing fuel injection pressure to increase the fuel injection window in any particular combustion chamber such that the deposits in respective orifices 300, 300', 360, 360' are exposed to higher than normal fuel mass flow for a longer period of time to increase the likelihood that the deposits are removed. Skip-firing is the technique of skipping the introduction and subsequent combustion of fuel in one or more combustion chambers, and instead introducing a larger amount of fuel into another combustion chamber, such that the total amount of fuel consumed by engine 110 remains the same. Instead of employing fuel to remove deposits in the fuel orifices of fuel injector 240, compressed air can be employed to blow-out the orifices at shutdown after liquid and/or gaseous fuel has been removed from the respective fuel rails 220 and 230. Compressed air can be obtained by bleeding off a portion of compression air from combustion chamber 340 during each engine cycle, or by employing engine brake air.

Figure 7:
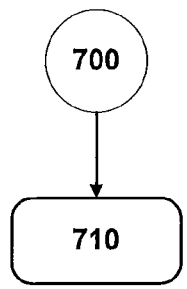
FIG. 7 is a flow chart view of a method for reducing deposit accumulation in orifices of the dual fuel injector of FIG. 3 according to another embodiment.
Figure 8:
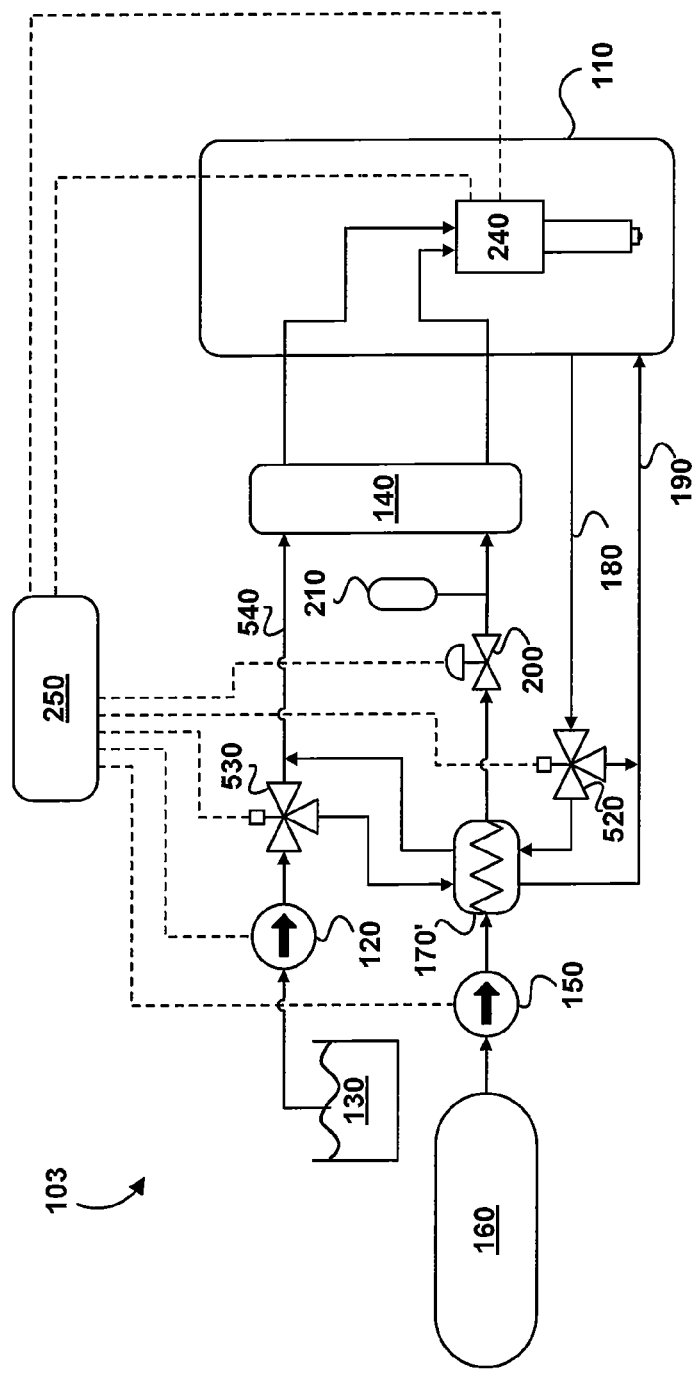
FIG. 8 is a schematic view of a fuel system that can adjust the temperature of a liquid fuel and a gaseous fuel according to one embodiment.

Referring now to FIGS. 7 and 8 an apparatus and method of reducing deposit accumulation in orifice holes 300, 300', 360 and 360' are now discussed according to a third embodiment. Deposit formation in the nozzle orifices of fuel injector 240 can be reduced by adjusting gaseous fuel and/or liquid fuel temperature. During those parts of the engine map of engine 110 where combustion chamber temperature and/or fuel injector nozzle temperature is known to be above a predetermined temperature, liquid and/or gaseous fuel temperature can be decreased to reduce the temperature of nozzle 260, thereby inhibiting the formation of deposits in the orifices. Liquids are better conductors of heat and preferably the liquid fuel temperature is adjusted to reduce and/or control nozzle temperature. In dual fuel injectors where the liquid fuel is employed both as a fuel and as a hydraulic fluid, it is possible that liquid fuel can flow through match fits into the gaseous fuel plenum such that it can also cool the gaseous fuel flow passages and injector body. However, there is an advantage to controlling the gaseous fuel temperature apart from the liquid fuel temperature. By using the liquefied gaseous fuel in cryogenic storage vessel 160 as a low temperature reservoir, the temperature of both the gaseous fuel and the liquid fuel can be controlled.

With reference to FIG. 7, in step 700 it is determined that deposit mitigation is needed. This determination may involve transitioning into and operating in a portion of the engine map where it is known that combustion chamber temperature increases above a predetermined value, or may involve an estimation of the nozzle temperature of fuel injector 240 based on engine parameters and/or a nozzle (tip) temperature model. An exemplary tip temperature model for a gaseous fuel injector nozzle is disclosed in the Applicant's co-owned International Patent Publication No. WO 2013/185234, published to Westport Power Inc. and GM Global Technology Operations LLC on Dec. 19, 2013. In step 710 the temperature of gaseous fuel and/or liquid fuel is adjusted (decreased) such that the temperature of nozzle 260 is reduced thereby inhibiting the formation of deposits.

With reference to FIG. 8, fuel system 103 illustrates a technique to adjust gaseous and/or liquid fuel temperature. Variable-flow valve apparatus 520 selectively adjusts the flow of engine coolant to heat exchange apparatus 170', by controlling how much engine coolant bypasses the heat exchange apparatus, such that the temperature of gaseous fuel downstream from the heat exchange apparatus can be controlled. Similarly, variable-flow valve apparatus 530 selectively adjusts the flow of liquid fuel to heat exchange apparatus 170', by controlling how much liquid fuel bypasses the heat exchange apparatus, such that the temperature of liquid fuel downstream of the variable-flow valve apparatus can be controlled. The portion of liquid fuel fluidly communicated to heat exchange apparatus 170' is cooled by using the gaseous fuel as a low temperature reservoir and then returned to conduit 540 where it is recombined with any liquid fuel fluidly communicating directly from variable-flow valve apparatus 530. Heat exchange apparatus 170' can comprise one or more heat exchangers, and can employ one or more heat exchange fluids.

An apparatus and method of reducing deposit formation is now discussed according to a third embodiment. Reductions in deposit formation have been observed when certain types of coatings are applied to nozzle 260, first valve member 280 and/or second valve member 290. Hydrophobic and oleophobic coatings when applied provide a non-stick type of protection for dual fuel injector 240 that inhibits the ability of deposits to stick to the nozzle and valve members of the injector. A particularly effective category of this type of coating is fluorosilane based coatings, since they have excellent hydrophobic and oleophobic qualities, in addition to a relatively high resistance to solvents, acids and bases, which is advantageous in gaseous and liquid fuel applications.

Catalytic coatings that encourage a beneficial effect can be employed to mitigate deposit formation. A first type of catalytic coating can facilitate the burning of deposits once they are formed thereby reducing and preferably preventing the accumulation of deposits. Catalytic coatings that include cerium oxide and/or oxides of other lanthanide series elements, oxides of transition metals and/or transition metals are particularly suitable for encouraging the chemical reaction of deposits with combustion chamber gases, and in particular oxygen from the intake charge. This type of coating is effective when applied to the outer surface of nozzle 260 in the vicinity of orifice 300 and to the outer surface of first valve member 280 in the vicinity of orifice 360 to reduce the formation of deposits around the openings of these orifices. The burning of deposits increases the temperature in the local vicinity, which is generally not preferable within fuel orifices 300 and 360 and on the valve members within valve body 270.

A second type of catalytic coating can promote the formation of a porous deposit structure on the surfaces of nozzle 260, first valve member 280 and/or second valve member 290. The porous deposit structure can be broken apart by the flow of gaseous fuel and liquid fuel through fuel orifices 300 and 360 respectively, unlike deposit formations formed without this type of coating. The second type of catalytic coating is a multi-phase microstructure in which one or more phases act as deposit nucleation sites that have a higher tendency to form carbon deposits, and promote the formation of the porous deposit structure. This type of coating is also preferably employed on the outer surface of nozzle 260 in the vicinity of orifice 300 and to the outer surface of first valve member 280 in the vicinity of orifice 360 to reduce deposit formation around the openings of these orifices. It is possible that this coating can be applied on the surfaces in these orifices as well, providing they do not substantially interfere with the flow of fuel therethrough. The same type of coatings used for the first type of catalytic coating can be used for the second type of catalytic coating in different combinations to promote the formation of a porous structure as opposed to consuming the deposits by burning. The coatings disclosed herein can be applied to dual fuel injector 240 by way of physical vapor deposition or chemical vapor deposition. The coatings discussed heretofore can be applied to any type of fuel injector including monofuel injectors as well as dual fuel injectors, and such injectors can be hydraulically or electro-mechanically actuated.

An apparatus and method of reducing deposit formation is now discussed according to a fourth embodiment. As an alternative to a fluorosilane coating, or in addition to, the surfaces of nozzle 260 and valve members 280 and 290 can be formed with a surface pattern that is characterized by an array of features small enough to reduce the ability of deposits to adhere to the underlying surface, such that the deposits are swept away by the flow of fuel through orifices 300 and 360. The surface pattern can be formed by lasers and lithography (including electron-beam lithography) and chemical patterning and chemical etching. An exemplary technique of forming the surface pattern is by way of femtosecond laser nanomachining that allows the surface features to be on the order of 10 to 100 nanometers. Surface patterns with features of this scale exhibit excellent hydrophobic and oleophobic characteristics. Surface patterns can include an array of elevated spires, an array of elevated polygons, and preferably regular polygons, in addition to other patterns. Surface nanomachining can be employed to remove surface irregularities that promote the adhesion of deposits. The surface patterning techniques disclosed herein can be applied to any type of fuel injector.

As an alternative to the above techniques, or in addition to, deposit control additives, for example detergents, can be mixed with the pilot fuel and/or the gaseous fuel. Surprisingly, when a deposit control additive was mixed with the pilot fuel only, it was discovered that deposit formation in gaseous fuel orifices 300 was reduced, in addition to a reduction in deposits in liquid fuel orifice 360. The additives act to reduce the formation of and/or remove existing deposit formations.

Figure 1:
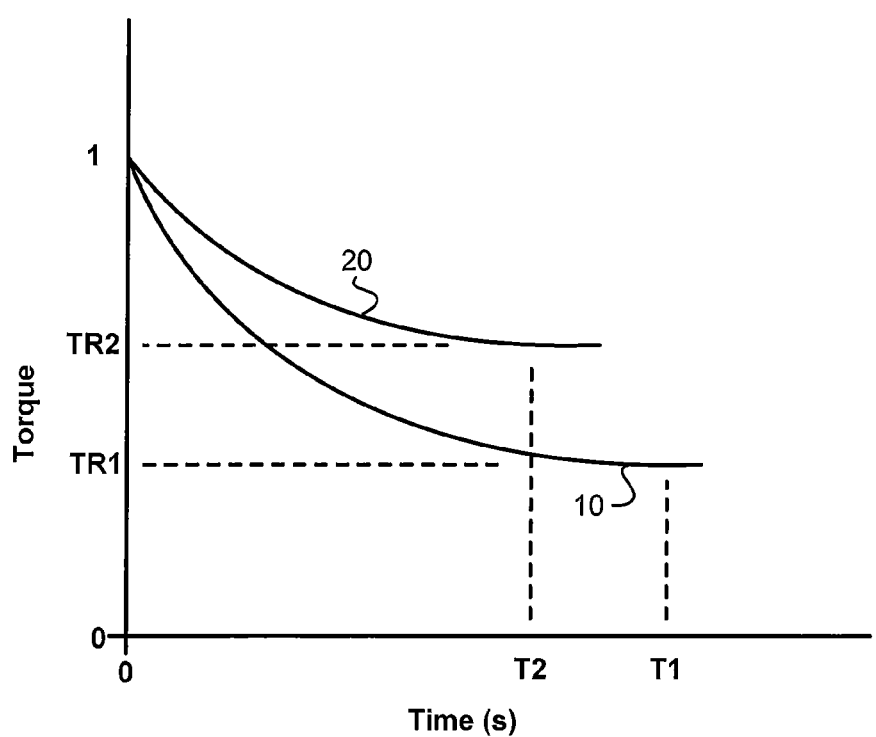
FIG. 1 illustrates torque curves for engines not employing and employing deposit accumulation mitigation techniques.

Referring back to FIG. 1, curve 20 represents a torque curve for engine 110 when at least one of the hereinbefore described deposit mitigation techniques is employed. The break-in period for torque curve 20 is time T2 and the maximum torque available after this period is torque TR2. As illustrated in FIG. 1, the break-in period for curve 20 (time T2) is less than for curve 10 (time T1), and the maximum torque available after this period is greater for curve 20 (torque TR2) than for curve 10 (torque TR1). At least one of the deposit mitigation techniques described herein is employed after time T2 to maintain the maximum available torque for engine 110 at TR2 within a predetermined range of tolerance.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for deposit mitigation in a gaseous fuel injector that introduces a gaseous fuel through a gaseous fuel orifice directly into a combustion chamber of an internal combustion engine comprising at least one deposit mitigation chosen from:
    a) reducing a length of the gaseous fuel orifice of the gaseous fuel injector by substantially between 10% to 50% of a length of a gaseous fuel orifice, of another gaseous fuel injector, showing deposit accumulation above a predetermined threshold;
    b) providing the gaseous fuel orifice with an inwardly and substantially linearly tapering profile;
    c) determining deposit mitigation is needed and
    performing at least one deposit mitigation technique chosen from:
        i) increasing gaseous fuel injection pressure whereby deposit accumulation is reduced in the gaseous fuel orifice during gaseous fuel injection; and
        ii) decreasing gaseous fuel temperature whereby a rate of deposit accumulation is reduced in the gaseous fuel orifice; and
    d) injecting compressed air through the gaseous fuel orifice during shutdown of the internal combustion engine,
    wherein torque loss in the internal combustion engine due to deposit accumulation in the gaseous fuel orifice is reduced below a predetermined value.

2. The method of claim 1, wherein the at least one deposit mitigation is chosen to be providing the gaseous fuel orifice with the inwardly and substantially linearly tapering profile, and further comprising providing the gaseous fuel orifice with a difference between an outlet-opening diameter and an inlet-opening diameter in a range substantially between 3 micrometers and 50 micrometers.

3. The method of claim 1, wherein the at least one deposit mitigation is chosen to be determining deposit mitigation is needed and performing the at least one deposit mitigation technique, the determining deposit mitigation is needed includes at least one determining deposit mitigation is needed technique chosen from:
    a) estimating a level of deposit accumulation and
    determining deposit mitigation is needed when the estimated level of deposit accumulation is greater than a predetermined value;
    b) counting a number of engine cycles and
    determining deposit mitigation is needed when the number of engine cycles is greater than a predetermined value; and
    c) timing an elapsed amount of time and
    determining deposit mitigation is needed when the elapsed amount of time is greater than a predetermined value.

4. The method of claim 1, further comprising increasing injection pressure by advancing fuel injection timing in the compression stroke for the gaseous fuel.

5. The method of claim 4, wherein gaseous fuel injection timing is advanced by at least 40 crank angle degrees.

6. The method of claim 4, further comprising advancing fuel injection timing when the internal combustion engine is operating without boost.

7. The method of claim 4, wherein the gaseous fuel injector is one of a plurality of gaseous fuel injectors associated with respective combustion chambers in the internal combustion engine, the method further comprises skip-firing one or more combustion chambers and increasing the fueling in remaining combustion chambers wherein the total amount of fueling remains the same.

8. The method of claim 1, wherein the at least one deposit mitigation is chosen to be determining deposit mitigation is needed and performing the at least one deposit mitigation technique, the determining deposit mitigation is needed includes at least one determining deposit mitigation is needed technique chosen from:
    operating in a part of an engine map of the internal combustion engine where combustion chamber temperature increases above a predetermined value; and
    estimating a nozzle temperature of the gaseous fuel injector is above a predetermined value.

9. The method of claim 1, further comprising decreasing heat transfer between engine coolant of the internal combustion engine and the gaseous fuel wherein gaseous fuel temperature decreases.

10. The method of claim 1, further comprising capturing compressed air from a combustion chamber of the internal combustion engine.

11. The method of claim 10, wherein the internal combustion engine is in an engine braking mode.

12. The method of claim 1, wherein the gaseous fuel injector is a dual fuel injector that also introduces a liquid fuel through a liquid fuel orifice directly into the combustion chamber, the method further comprising at least one other deposit mitigation chosen from:
    a) reducing a length of the liquid fuel orifice of the dual fuel injector by substantially between 10% to 50% of the length of the gaseous fuel orifice, of the another gaseous fuel injector, showing deposit accumulation above a predetermined threshold;

b) providing the liquid-fuel orifice with an inwardly and substantially linearly tapering profile;

c) determining deposit mitigation is needed and performing at least one deposit mitigation technique chosen from:
   i) increasing liquid fuel injection pressure wherein deposit accumulation in the liquid fuel orifice is reduced during fuel injection; and
   ii) decreasing liquid fuel temperature wherein a rate of deposit accumulation in the liquid fuel orifice is reduced;

wherein deposit accumulation in the liquid fuel orifice is reduced below a predetermined level.

13. The method of claim 12, further comprising providing the liquid fuel orifice with a difference between a liquid fuel orifice outlet-opening diameter and a liquid fuel orifice inlet-opening diameter in a range substantially between 3 micrometers and 50 micrometers.

14. The method of claim 12, further comprising increasing heat transfer from the liquid fuel to the gaseous fuel wherein liquid fuel temperature decreases.

15. The method of claim 12, further comprising increasing injection pressure by advancing fuel injection timing in the compression stroke for at least one of the liquid fuel and the gaseous fuel.

16. The method of claim 15, wherein liquid fuel injection timing is advanced by at least 20 crank angle degrees.

17. A gaseous fuel injector for directly introducing a gaseous fuel into a combustion chamber of an internal combustion engine comprising:
   a gaseous fuel injection valve;
   a gaseous fuel orifice extending between a first chamber downstream from the gaseous fuel injection valve and outside the gaseous fuel injector; the gaseous fuel orifice having at least one deposit mitigation feature chosen from:
      a length of the gaseous fuel orifice of the gaseous fuel injector is reduced by substantially between 10% to 50% of a length of a gaseous fuel orifice, of another gaseous fuel injector, showing deposit accumulation above a predetermined threshold; and
      the gaseous fuel orifice comprising an inwardly and substantially linearly tapering profile;
   wherein torque loss in the internal combustion engine due to deposit accumulation in the gaseous fuel orifice is reduced below a predetermined value.

18. The gaseous fuel injector of claim 17, wherein outside the gaseous fuel injector is inside the combustion chamber of the internal combustion engine.

19. The gaseous fuel injector of claim 17, wherein a difference between an outlet-opening diameter and an inlet-opening diameter of the gaseous fuel orifice is in a range substantially between 3 micrometers and 50 micrometers.

20. The gaseous fuel injector of claim 17, wherein the gaseous fuel injector is a dual fuel injector that also introduces a liquid fuel into the combustion chamber, the dual fuel injector further comprising:
   a liquid fuel injection valve;
   a liquid fuel orifice extending between a second chamber downstream from the liquid fuel injection valve and outside the dual fuel injector;
   the liquid fuel orifice having at least one deposit mitigation feature chosen from:
      a length of the liquid fuel orifice is reduced by substantially between 10% to 50% of a length of a liquid fuel orifice of another dual fuel injector showing deposit accumulation above a predetermined threshold; and
      the liquid fuel orifice comprising an inwardly and substantially linearly tapering profile;
   wherein deposit accumulation in the liquid fuel orifice is reduced below a predetermined level.

21. The gaseous fuel injector of claim 20, wherein a difference between a liquid fuel orifice outlet-opening diameter and a liquid fuel orifice inlet-opening diameter is in a range substantially between 3 micrometers and 50 micrometers.

22. A method for deposit mitigation of a hydraulically actuated gaseous fuel injector that introduces a gaseous fuel through a gaseous fuel nozzle orifice, the method comprising mixing hydraulic fluid with an additive such that deposit accumulation is reduced in the gaseous fuel nozzle orifice.

23. The method of claim 22, wherein the hydraulically actuated gaseous fuel injector is a dual fuel injector that introduces the gaseous fuel through the gaseous fuel nozzle orifice separately and independently from a liquid fuel through a liquid fuel nozzle orifice, the method comprising mixing the liquid fuel with an additive such that deposit accumulation is reduced in the gaseous fuel nozzle orifice.

24. The method of claim 23, wherein the hydraulic fluid is the liquid fuel.

25. The method of claim 1, wherein each of the deposit mitigation (a), (b), (c) and (d) are carried out.

* * * * *